(12) United States Patent
Linden

(10) Patent No.: US 6,405,119 B1
(45) Date of Patent: Jun. 11, 2002

(54) METHOD AND APPARATUS FOR LIMITING THE TRAVELING SPEED OF A MOTOR VEHICLE

(75) Inventor: Thomas Linden, Stuttgart (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/578,480

(22) Filed: May 26, 2000

(30) Foreign Application Priority Data

May 31, 1999 (DE) ......... 199 24 947

(51) Int. Cl.$^7$ .......... B60K 31/00; B60K 41/08
(52) U.S. Cl. .......... 701/95; 701/93; 701/110; 180/179
(58) Field of Search .......... 701/93, 95, 110; 123/352, 319, 349, 351, 361; 180/179, 177, 170

(56) References Cited

U.S. PATENT DOCUMENTS

| | | | |
|---|---|---|---|
| 5,549,089 A | * 8/1996 | Snell et al. | 123/352 |
| 5,685,801 A | * 11/1997 | Benford et al. | 477/108 |
| 5,713,428 A | * 2/1998 | Linden et al. | 180/179 |
| 5,774,820 A | * 6/1998 | Linden et al. | 701/93 |
| RE36,186 E | * 4/1999 | White et al. | 477/108 |
| 6,052,644 A | * 4/2000 | Murakami et al. | 701/93 |
| 6,144,911 A | * 11/2000 | Binz et al. | 701/51 |

FOREIGN PATENT DOCUMENTS

| | | |
|---|---|---|
| DE | 44 07 082 A1 | 3/1994 |
| DE | 44 34 022 A1 | 9/1994 |
| DE | 195 09 492 C2 | 3/1995 |

* cited by examiner

Primary Examiner—Tan Nguyen
Assistant Examiner—Dalena Tran
(74) Attorney, Agent, or Firm—Crowell & Moring LLP

(57) ABSTRACT

In a method for limiting the traveling speed of a motor vehicle to a variable maximum speed a limiting system action takes place in the situation where the speed demanded by the driver via the actual accelerator pedal position is higher than the preset maximum speed. In this case, taking account of vehicle state and operating variables, control signals can be produced in order to select a specific gear in the transmission. At the time when the preset maximum speed is switched off, an accelerator pedal substitute variable which correlates with the preset maximum speed is compared with an actual accelerator pedal position. When the actual accelerator pedal position is greater than the accelerator pedal substitute variable at the time when the maximum speed is switched off, a defined minimum gear is preset as the lower gear limit in the transmission.

8 Claims, 2 Drawing Sheets

METHOD AND APPARATUS FOR LIMITING THE TRAVELING SPEED OF A MOTOR VEHICLE

This application is related to the following co-pending U.S. patent applications filed concurrently herewith: Ser. No. 09/578,479; and Ser. No. 09/578,855.

BACKGROUND AND SUMMARY OF THE INVENTION

This application claims the priority German patent document 199 24 947.4, filed May 31, 1999, the disclosure of which is expressly incorporated by reference herein.

The invention relates to a method and an apparatus for limiting the traveling speed of a motor vehicle.

Cruise control systems are known in which a maximum speed preset by the driver or calculated via an automatic determination system can be maintained automatically in a motor vehicle. Such cruise control systems include both Tempomat functions, in which the vehicle is intended to maintain a minimum speed selected by the driver, and limiter functions, in which the vehicle must not exceed a maximum speed that is preset by the driver or is determined automatically (for example, by a proximity control system). In cruise control systems, control signals are generated based on the maximum speed and the actual vehicle state variables (in particular, the actual vehicle speed), and are used to adjust the engine, the transmission or the wheel brakes in order to maintain the maximum speed.

In German patent document DE 44 07 082 A1 a motor vehicle automatic transmission is controlled to brake the vehicle from its instantaneous speed to a desired maximum speed which is determined, for example, based on the distance from a vehicle traveling in front. For this purpose, a change to a lower gear is forced to occur, thereby achieving a higher transmission ratio, with a greater deceleration level. In this system, the driver can operate the accelerator pedal to deactivate the automatic proximity or cruise control and to vary the distance from the vehicle traveling in front as he himself desires.

A cruise control system with a limiter function is disclosed in German patent document DE 195 09 492 C2, in which the driver can preset a maximum permissible speed. The control system automatically limits the vehicle speed to the maximum speed when operation of the accelerator pedal by the driver would result in a vehicle speed greater than the selected maximum speed. In this situation, a control signal which corresponds to the maximum signal and is used to vary the engine and the transmission is produced irrespective of the actual accelerator pedal position.

If the preset maximum speed is manually deactivated by the driver, the engine torque is increased from the last value of the control signal produced by the limiter system to a value which corresponds to the actual accelerator pedal position. If the actual accelerator pedal position is significantly greater than the last value of the control signal from the limiter system, then the system attempts to increase the engine torque in as short a time as possible to such an extent that the actual and desired engine torque match. This effort to produce a high engine torque causes the automatic transmission to shift down to lower gears while the engine speed at the same time increases. This can be annoying to the driver, who in some circumstances is not aware of the increased accelerator pedal position, and can possibly cause incorrect reactions and dangerous situations.

German patent document DE 44 34 022 A1 relates essentially to processes which take place while speed limitation is activated. In the kick-down mode, the transmission is controlled so that gear selection is limited to second gear, it being impossible to change down to first gear. However, such downshifting is feasible only in the lowest speed range, for example if the speed limiting is preset to 30 km/h. If, on the other hand, the speed limitation in the control system is set to a higher speed, first gear cannot be selected anyway.

This document does not refer to any more far-reaching transmission actions, in particular for the situation where the actual accelerator pedal position at the time when speed limitation is switched off is greater than the accelerator pedal substitute variable.

The object of the present invention is to improve driving safety in vehicles that are equipped with an automatic transmission and a speed limiter system.

This and other objects and advantages are achieved by the method and apparatus according to the invention, in which a low gear limit is introduced which takes effect at the time when the cruise control system is switched off, in order to prevent the automatic transmission from automatically changing gears after deactivation of the speed limiting system in a manner which is objectively and subjectively unpleasant or is dangerous. Those situations in which undesired gear changes are to be suppressed, or at least limited, are identified automatically by the system. These are situations in which, at the time when the system is switched off, the actual accelerator pedal position input by the driver is greater than the value of an accelerator pedal substitute variable. The latter variable is preset by the limiter system, based on the selected maximum speed and, when the control system is activated, is used by the limiter system as the basis for setting the transmission, and possibly the engine and the brakes. The comparison between the actual accelerator pedal position and the accelerator pedal substitute variable provides a reliable basis for the decision whether to implement a low gear limit after the system is switched off. The accelerator pedal positions correlate with engine torque; accordingly, a direct comparison of the actual engine torque applied by the speed limiter system and the engine torque corresponding to the actual accelerator pedal position can also be used as the basis for the method and the apparatus for controlling the automatic transmission.

The gear limit is produced by presetting a defined minimum gear, whose level depends on the vehicle state and operating variables (in particular on the actual vehicle speed), the load, the road gradient or the road condition etc. Addition variables which influence the gear limit may take account of electronic driving actions which stabilize the vehicle, such as drive slip control, an antilock braking system or the like.

According to the gear limitation, once the speed limiter system has been deactivated, downward transmission gear changes are prevented or at least limited, so that engine torque and vehicle speed rise smoothly to the value corresponding to the actual accelerator pedal position. Steep rises or sudden changes in the engine torque are avoided, so that driving safety is objectively and subjectively improved.

In an advantageous embodiment, the time period is measured within which a minimum gear is preset as the low gear limit, based on the ratio of the actual accelerator pedal position to the accelerator pedal substitute variable. The low gear limit is maintained, after the cruise control has been switched off, for as long as the actual accelerator pedal position is greater than the accelerator pedal substitute value or some other variable which correlates with the vehicle speed or the engine torque. In this situation, the driver would like a torque that is greater than the actual engine torque; the presetting of the minimum gear is not cancelled until the torque desired by the driver has been reached.

Both the actual accelerator pedal position and the accelerator pedal substitute variable each have an engine torque associated with them internally in the speed limiter system or in some other vehicle regulation and control unit, and the rise in the accelerator pedal substitute variable is carried out in accordance with a preset engine torque characteristic until the actual accelerator pedal position is reached. Presetting the torque profile allows the vehicle behavior to be influenced optimally.

The minimum gear is determined as a function of vehicle state variables, in particular as a function of the preset vehicle maximum speed. Within the time period under consideration, in which the actual accelerator pedal position is greater than the accelerator pedal substitute variable, the minimum gear can be defined as a function of state variables as a predetermined functional profile. In particular, a staircase function is used for the minimum gear as a function of the selected maximum speed.

The actual vehicle operating mode—in particular normal operation or kick-down operation—can also be taken into account. In kick-down operation, account is taken of the driver's wish for a faster increase in speed; for this purpose, a different profile is used for the minimum gear, in which a next-higher minimum gear is advantageously set for preset maximum speeds which are greater than in normal operation, so that increased engine speeds are reached during acceleration.

Immediately after the cruise control has been switched off, the actual gear which is selected in the transmission at the time when the system is switched off is initially maintained for a given time period. This forces a dead-time response, in which a gear change is carried out only after a time delay. However, it may be expedient to provide for this dead-time response to be overridden by specific driver reactions, for example kick-down operation.

Other objects, advantages and novel features of the present invention will become apparent from the following detailed description of the invention when considered in conjunction with the accompanying drawings.

DETAILED DESCRIPTION OF THE DRAWINGS

The flowchart shown in FIG. 1 and described in the following text is implemented in an apparatus for controlling an automatic transmission in a motor vehicle. This apparatus comprises a speed limiter system in a regulation and control unit, by means of which a speed limiter system maximum speed, which is either preset by the driver or is calculated automatically, can automatically be maintained by influencing the transmission and the engine. A proximity control system, for example, may be used to determine the maximum speed automatically, with such a system being able to determine the distance from a vehicle traveling in front, and to keep the distance constant, taking account of the actual vehicle speed.

Figure 1:
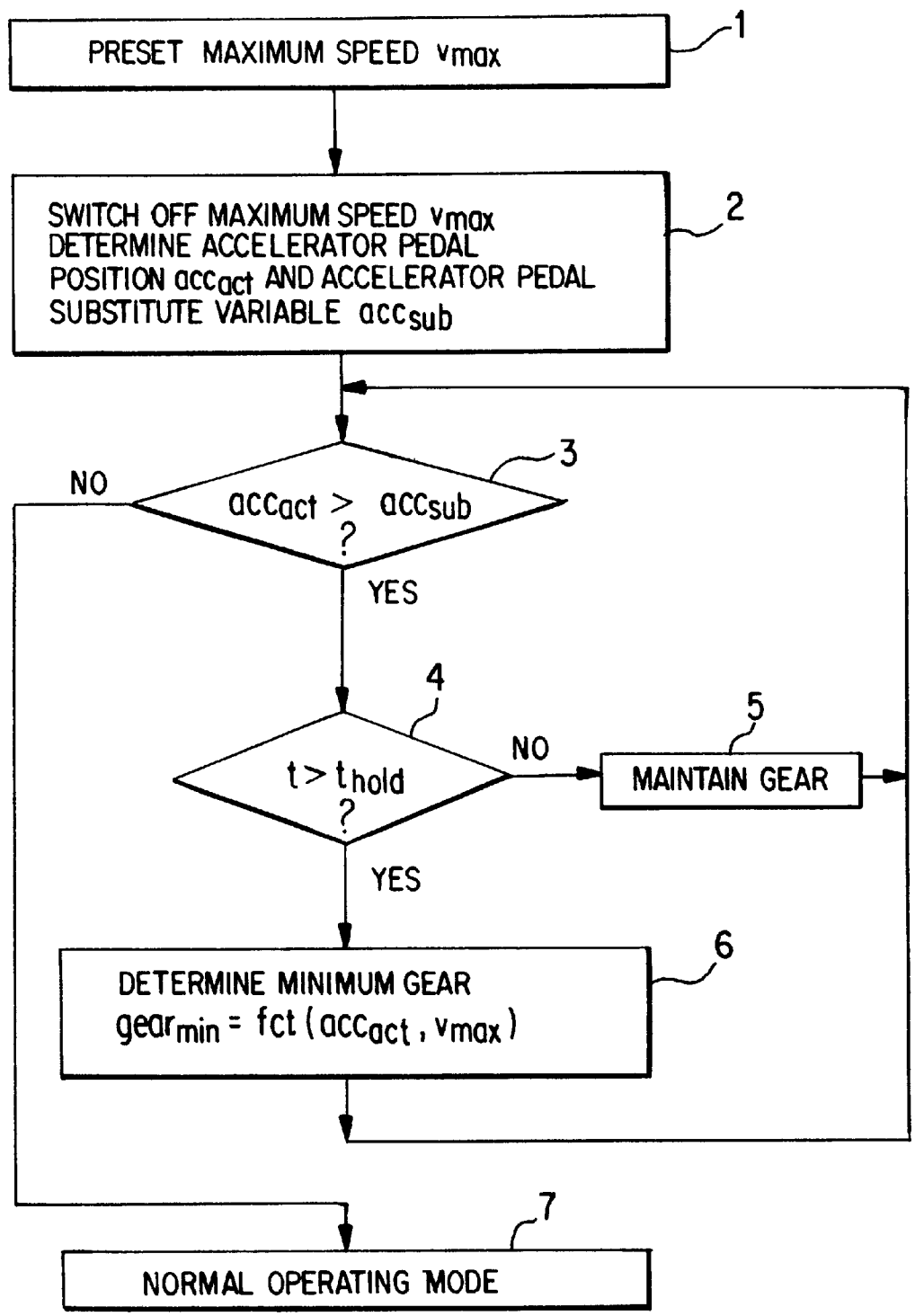
FIG. 1 is a flowchart which shows the fundamental method steps for controlling an automatic transmission according to the invention.

As shown in FIG. 1, a maximum speed $v_{max}$ is preset in the speed limiter system in a method step 1; this speed is maintained automatically until manually deactivated by the driver in step 2. In the period between the time at which the maximum speed $v_{max}$ is switched off in step 2 and the return to the normal operating mode step 7, a control action is carried out, as shown in method steps 3 to 6, which influences the gear-selection control in an automatic transmission. This control action is intended to help to avoid dangerous situations resulting from a major increase in torque immediately following deactivation of the speed limiting.

A precondition for the controlled transmission action according to steps 3 to 6 is first of all that the actual accelerator position $acc_{act}$ produced by the driver is detected and stored. In addition, an accelerator pedal substitute variable $acc_{sub}$ is determined, which corresponds to an accelerator pedal position value that is present at the output of the limiter system and on which the speed limiting to the selected maximum speed is based. The actual accelerator pedal position $acc_{act}$ and the accelerator pedal substitute variable $acc_{sub}$ may diverge when speed limiting is activated, since the accelerator pedal substitute variable $acc_{sub}$ is preset by the speed limiter system in accordance with the preset maximum speed, irrespective of the actual accelerator pedal position $acc_{act}$. An increase in the actual accelerator pedal position $acc_{act}$ by the driver has no influence on the vehicle speed, since the limiter limits the vehicle speed to the maximum permissible speed. An increased actual accelerator position $acc_{act}$ which is lower than the accelerator pedal substitute variable $acc_{sub}$ (which correlates with the maximum speed) always leads, on the other hand, to the engine torque and the vehicle speed being varied in accordance with the manual driver operation. To this extent, a minimum selection is made in the limiter system from the actual accelerator pedal position $acc_{act}$ and the accelerator pedal substitute variable $acc_{sub}$.

If required, the limiter may be deactivated in specific accelerator pedal positions, for example in the kick-down position.

The actual accelerator pedal position $acc_{act}$ found in step 2, and the accelerator pedal substitute variable $acc_{sub}$ are compared with one another in step 3. If the actual accelerator pedal position $acc_{act}$ produced by the driver is less than or equal to the accelerator pedal substitute variable $acc_{sub}$, then the process continues along the "no" branch corresponding to method step 7, to the regular operating mode without the limiter carrying out any controlling action in the automatic transmission. In this situation, the fact that the actual accelerator pedal position $acc_{act}$ is less than the corresponding value of the accelerator pedal substitute variable $acc_{sub}$, means that the driver demand is less than that which is produced at the moment when the speed limiter system was switched off; the driver's wish has priority over the setting by the regulation or limiter system. The lower driver demand means that the torque demand is lower after the speed limiter system has been switched off. No sudden torque changes need be expected, so that it is possible to return to the normal operating mode without any danger.

For the situation where the driver demand $acc_{act}$ is greater than the accelerator pedal substitute variable $acc_{sub}$, the process proceeds to step 4, where it is determined whether the process is within a time interval $t_{hold}$, which immediately follows the maximum speed $v_{max}$ being switched off. Within the time interval $t_{hold}$, the last selected gear is intended to be maintained, and no gear change is intended to be carried out. During the time before the actual process reaches the end of the time interval $t_{hold}$, the process continues along the "no" branch in accordance with step 5 (maintain gear), and then, in a new cycle, returns to method step 3, which marks the start of the transmission control process following cruise control;

When it is found in method step 5 that the time interval $t_{hold}$ has already passed, the process continues to step 6, in which the minimum gear ($gear_{min}$) is set as the low gear limit, as a function of the actual accelerator pedal position $acc_{act}$ and the maximum speed $v_{max}$ most recently selected in the limiter system. The signal corresponding to the minimum gear $gear_{min}$ is supplied as a control signal to the transmission for appropriate gear selection.

When determining the minimum gear as the low gear limit in step 6, specific pedal positions $acc_{act}$, in particular a kick-down pedal position, may be taken into account. If the driver has pressed the accelerator pedal all the way down, then a different gear profile, which takes account of the driver's wish for faster acceleration is selected. In this context, the determination of the minimum gear depends on the accelerator pedal position $acc_{act}$.

A dependency on the limiter maximum speed $v_{max}$ exists to the extent that the minimum gear $gear_{min}$ is determined on the basis of the choice of the most recently selected limiter speed.

The transmission control process of steps 3–6 is continued until it moves to the normal operating mode 7 in step 3.

Various vehicle operating and state variables may be taken into account to determine the minimum gear, with an actual minimum gear being defined in each cyclic run through the determination process.

Figure 2:
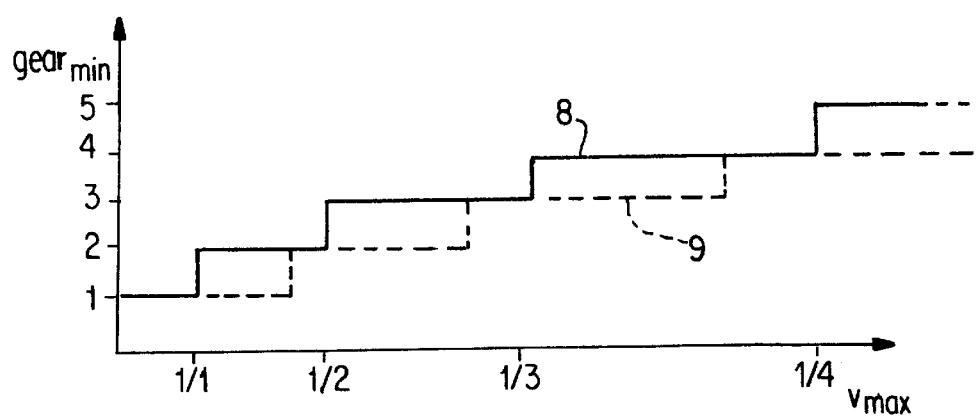
FIG. 2 is a graph which shows the profile of the minimum gear as a function of the vehicle speed.

FIG. 2 shows a profile of low gear limiting in which a minimum gear ($gear_{min}$) is set as a function of the maximum speed $v_{max}$ that is preset and used in the limiter system. The profile rises in the form of a staircase from gear 1 to gear 5, with a gear change to the next higher gear being carried out on reaching specific maximum speeds $v_1$ to $v_4$. The intervals between adjacent maximum speeds at which a step-function change takes place increase as the speed rises. A number of $gear_{min}$, functional profiles may be preset, and may be activated as a function of various parameters or state variables. In the exemplary embodiment, a first $gear_{min}$ curve 8 and a second $gear_{min}$ curve 9 are provided, with the curve 8 being used for accelerator pedal positions $acc_{act}$ greater than the accelerator pedal substitute variable $acc_{sub}$ but less than the full accelerator position, and the curve 9 being used for kick-down operation.

Figure 3:
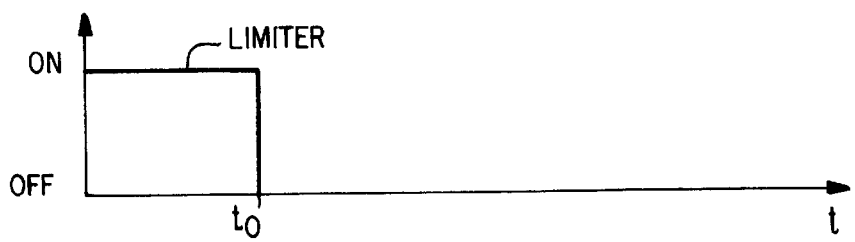
FIG. 3 is a graph of the profile of a limiter function in a speed limiter system.
Figure 4:
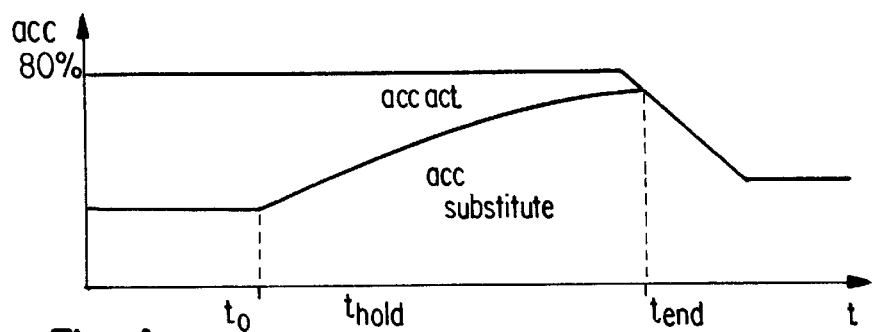
FIG. 4 is a graph of the profile of the actual and the accelerator pedal substitute variables.
Figure 5:
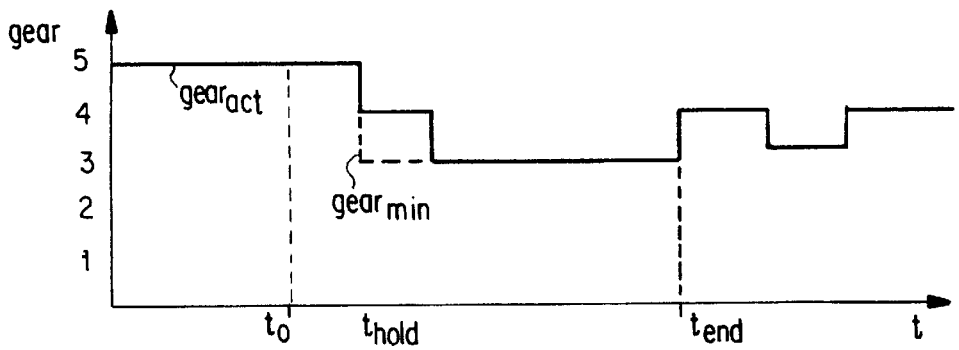
FIG. 5 is a graph which shows the time of the gear profile.

FIGS. 3 to 5 show timing profiles for various vehicle functions and vehicle state variables. FIG. 3 shows the switching status of the limiter system (which expediently forms a functional element within the regulation and control unit of the vehicle). The limiter, which allows a top speed to be defined as the maximum speed, corresponds to method step 1 in FIG. 1. When the limiter is switched on (the time interval before $t_o$ in FIG. 3), the maximum permissible speed is maintained by the limiter.

The accelerator pedal substitute variable $acc_{sub}$ illustrated in FIG. 4 may be used to preset the maximum speed. As shown in FIG. 4, when the limiter is switched on, the accelerator pedal substitute variable $acc_{sub}$ is less that the actual accelerator pedal position $acc_{act}$ which, in the exemplary embodiment, is around 80% of the maximum possible value. After the limiter has been switched "off" at time to in FIG. 2, the accelerator pedal substitute variable $acc_{sub}$ is increased to match the actual accelerator pedal position $acc_{act}$, in the regulation and control unit, according to a nonlinear profile obtained from a preset profile for the increase in the engine torque. It continues to increase until it reaches the actual accelerator pedal position $acc_{act}$, at time $t_{End}$. Transmission control takes place between the times $t_0$ and $t_{End}$. Once the actual accelerator pedal position has been reached, there is no longer any divergence between the corresponding signal produced in the regulation and control unit and the driver operation, and transmission control is deactivated in favor of manual selection by the driver.

FIG. 5 shows the associated profile for the transmission gears. The solid line represents the actual profile $gear_{act}$ for the transmission gears, and the dashed line represents the timing of the $gear_{min}$ profile for low gear limiting, which is activated between the times $t_0$ and $t_{End}$ (and is inactive before $t_0$ and after $t_{End}$). In the exemplary embodiment, gear 5 is selected at the time $t_0$, with the limiter switched on and allowing a preset maximum speed $v_{max}$ to be implemented.

After the limiter has been switched off at the time $t_o$, the actual gear is limited by the activated low gear limit $gear_{min}$. A holding time is first maintained until the time $t_{hold}$, in which any gear changes are suppressed irrespective of the vehicle speed and external requirements, so that gear 5 is temporarily maintained. Once the time interval $t_{hold}$ has elapsed, the transmission changes down in steps, due to the torque demand, to the 3rd gear, which is preset by the low gear limit $gear_{min}$. (Further downshifting is suppressed by the low gear limit.) The 3rd gear for the low gear limit between the times $t_{hold}$ and $t_{End}$ results from the profile of the minimum gear ($gear_{min}$) shown in FIG. 2 and depends on the most recently selected maximum speed which, in the exemplary embodiment, was between the speed limits $v_2$ and $v_3$.

After the end of gear limiting at the time $t_{End}$, the gear selection scheme once again follows the normal transmission logic.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. In a motor vehicle having an automatic transmission, a method for controlling gear selection, and for limiting the traveling speed to a presetable maximum speed, said method comprising:

limiting vehicle speed when a speed demanded by the driver via an actual accelerator pedal position exceeds a preset maximum speed;

generating control signals to select a specific gear in said automatic transmission, taking account of vehicle state and operating variables;

when the preset maximum speed is switched off, comparing an accelerator pedal substitute variable, which correlates with the preset maximum speed, with an actual accelerator pedal position; and if the actual accelerator pedal position is greater than the accelerator pedal substitute variable when the preset maximum speed is switched off, setting a defined minimum gear as a lower gear limit in the automatic transmission, wherein:

if the actual accelerator pedal position is greater than the accelerator pedal substitute variable when the preset maximum speed is switched off, maintaining the actual gear as the minimum gear for a given time interval; and after the time interval has elapsed, determining the minimum gear as a function of at least one of vehicle operating mode and vehicle state variables.

2. The method according to claim 1, wherein, after the maximum speed has been switched off, the minimum gear is maintained as long as the actual accelerator pedal position remains greater than the accelerator pedal substitute variable.

3. The method according to claim 1, wherein, after the maximum speed has been switched off, the accelerator pedal substitute variable is increased continuously until it reaches the actual accelerator pedal position.

4. The method according to claim 1, wherein the actual accelerator pedal position and the accelerator position substitute variable each have an associated engine torque; and the accelerator pedal substitute variable is increased to the actual accelerator pedal position in accordance with a preset torque profile.

5. The method according to claim 1, wherein a profile which is dependent on the preset maximum speed is defined for the minimum gear.

6. The method according to claim 1, wherein a modified minimum gear is defined when the accelerator pedal is fully depressed.

7. The method according to claim 1, wherein limitation to the minimum gear is cancelled as soon as the accelerator pedal substitute variable is at least of equal magnitude to the actual accelerator pedal position.

8. Apparatus for controlling gear selection and limiting traveling speed to a presetable maximum speed in a vehicle having an automatic transmission and a speed limiter system in which the speed corresponding to the engine torque demanded by the driver via the actual accelerator pedal position is compared with a preset maximum speed for generating control signals taking account of vehicle state and operating variables in order to select a specific gear, such control signals being supplied to the automatic transmission, wherein:

when the preset maximum speed is switched off, an accelerator pedal substitute variable which correlates with the preset maximum speed is compared with an actual accelerator pedal position, and when the actual accelerator pedal position is greater than the accelerator pedal substitute variable, a control signal for selecting low gear limiting with a defined minimum gear is supplied to the automatic transmission;

if the actual accelerator pedal position is greater than the accelerator pedal substitute variable when the maximum speed is switched off, the actual gear is initially maintained for a set time interval; and after the set time interval has elapsed, a control signal is produced which acts on the automatic transmission, and which represents a minimum gear as a function of the vehicle operating mode and/or vehicle state variables.

\* \* \* \* \*